US012782620B2

(12) United States Patent
Spahn

(10) Patent No.: US 12,782,620 B2
(45) Date of Patent: Nov. 3, 2026

(54) EPOXY-BASED INFRARED FILTER ASSEMBLY AND ASSOCIATED FABRICATION DEVICES AND METHODS

(71) Applicant: Fermi Forward Discovery Group, LLC, Chicago, IL (US)

(72) Inventor: Gabriel Spahn, Rapid City, SD (US)

(73) Assignee: Fermi Forward Discovery Group, LLC, Chicago, IL (US)

( * ) Notice: Subject to any disclaimer, the term of this patent is extended or adjusted under 35 U.S.C. 154(b) by 91 days.

(21) Appl. No.: 19/026,694

(22) Filed: Jan. 17, 2025

(65) Prior Publication Data

US 2025/0164678 A1 May 22, 2025

Related U.S. Application Data

(63) Continuation of application No. 18/541,230, filed on Dec. 15, 2023, now Pat. No. 12,216,299, which is a (Continued)

(51) Int. Cl.
*G02B 5/20* (2006.01)
*G01J 5/0802* (2022.01)
(Continued)

(52) U.S. Cl.
CPC ............ *G02B 5/208* (2013.01); *G01K 11/006* (2013.01); *G01T 1/1606* (2013.01); *G02B 1/04* (2013.01); *G01J 5/0802* (2022.01)

(58) Field of Classification Search
CPC .... G01J 5/0802; G01K 11/006; G01T 1/1606; G02B 1/04; G02B 5/208
See application file for complete search history.

(56) References Cited

U.S. PATENT DOCUMENTS 11,880,053 B2 1/2024 Spahn

FOREIGN PATENT DOCUMENTS

WO 2021017574 A1 2/2021

OTHER PUBLICATIONS

Cornell, Brett Durcan, "A Dark Matter Search Using the Final SuperCDMS Soudan Dataset and the Development of a Large-Format, Highly-Multiplexed, Athermal-Phonon-Mediated Particle Detector," Thesis for Degree of Doctor of Philosophy, California Institute of Technology, Pasadena, California, 2018, 231 pages.

(Continued)

*Primary Examiner* — Mark R Gaworecki
(74) *Attorney, Agent, or Firm* — William A. Harding; Grable Martin PLLC

(57) ABSTRACT

Epoxy-based inline infrared (IR) filter assembly, and manufacture and use of the same. Co-axial infrared filter assemblies comprise a substantially cylindrical filter body forming a central cavity characterized by opposing holes at each end. The filter body forms an outer conductor, and SMA connectors coupled to the opposing holes at each end of the body are electrically coupled to form an inner conductor positioned along a long axis of the filter body. An infrared absorbing material (such as castable epoxy resin) fills the central cavity of the filter body. Methods for producing the co-axial infrared filter include pressing SMA connectors into the respective ends of the filter body, electrically coupling the SMA connectors, and filling the filter body with epoxy. Electronic systems for operating a dark matter detector include a feedline comprising a coaxial filter configured to advantageously block infrared noise.

20 Claims, 13 Drawing Sheets

Related U.S. Application Data continuation of application No. 17/405,013, filed on Aug. 17, 2021, now Pat. No. 11,880,053.

(51) Int. Cl.
*G01K 11/00* (2006.01)
*G01T 1/16* (2006.01)
*G02B 1/04* (2006.01)

(56) References Cited

OTHER PUBLICATIONS

Fang, Michael, "Development of Hardware for Scaling Up Superconducting Qubits and Simulation of Quantum Chaos," University of California, Santa Barbara, Jun. 12, 2015, 56 pages.
Gao, Jiansong, "The Physics of Superconducting Microwave Resonators," Thesis for Degree of Doctor of Philosophy, California Institute of Technology, Pasadena, California, 2008, 197 pages.
Geerlings, Kurtis Lee, "Improving Coherence of Superconducting Qubits and Resonators," Dissertation for Degree of Doctor of Philosophy, Yale University, Dec. 2013, 256 pages.
Minutolo, L., et al., "A Flexible GPU-Accelerated Radio-Frequency Readout for Superconducting Detectors," IEEE Transactions on Applied Superconductivity, 2019, 5 pages.
Moore, David Craig, "A Search for Low-Mass Dark Matter with the Cryogenic Dark Matter Search and the Development of Highly Multiplexed Phonon-Mediated Particle Detectors," Thesis for the Degree of Doctor of Philosophy, California Institute of Technology, Pasadena, California, 2012, 263 pages.
Spahn, Gabriel, "Improving Performance of a Multiplexed Dark Matter Detector via Infrared Isolation," Thesis for Honors Bachelor's Degree, University of Minnesota, Apr. 2021, 51 pages.
Zmuidzinas, Jonas, "Superconducting Microresonators: Physics and Applications," The Annual Review of Condensed Matter Physics, 2012 pp. 169-214.
Zyla, P.A., et al., "Review of Particle Physics," Progress of Theoretical and Experimental Physics, 2020, p. 480.

PRIOR ART

EPOXY-BASED INFRARED FILTER ASSEMBLY AND ASSOCIATED FABRICATION DEVICES AND METHODS

CROSS-REFERENCE TO RELATED APPLICATIONS

This application is a continuation and claims the benefit under 35 U.S.C. § 120 of U.S. patent application Ser. No. 18/541,230 filed by the inventor of the present application on Dec. 15, 2023 and titled EPOXY-BASED INFRARED FILTER ASSEMBLY AND ASSOCIATED FABRICATION DEVICES AND METHOD which, in turn, is a continuation and claims the benefit under 35 U.S.C. § 120 of U.S. Pat. No. 11,880,053 issued on Jan. 23, 2024 and titled EPOXY-BASED INFRARED FILTER ASSEMBLY AND ASSOCIATED FABRICATION DEVICES AND METHOD, the entire contents of each of which are incorporated herein by reference.

STATEMENT REGARDING FEDERALLY SPONSORED RESEARCH OR DEVELOPMENT

The invention described in this patent application was made with Government support under the Fermi Forward Discovery Group, LLC, Contract Number 89243024CSC000002 awarded by the U.S. Department of Energy. The Government has certain rights in the invention.

FIELD OF THE INVENTION

The present invention relates generally to inline filter technology. More specifically, this invention pertains to infrared (IR) filter devices and assemblies for reducing background IR photons incident to a superconducting substrate, and manufacturing methods for the same.

BACKGROUND OF THE INVENTION

The existence of dark matter (i.e., particles that appear to have mass but that do not appear to absorb nor emit any electromagnetic radiation) has been confirmed by an array of cosmological and astronomical experiments. Over the past two decades, experiments have probed large swathes of parameter space to ascertain the exact nature of dark matter, but with limited results. In the light-mass fermionic regime, known solid-state cryogenic experiments have probed dark matter down past 0.2 Giga-electron volt (GeV) using as detectors a variety of crystal calorimeters. Looking ahead to the realm of sub-GeV-mass dark matter, such detector designs encounter difficulties with scalability. Higher sensitivity requires larger amounts of instrumented surface area, but each individual detector requires its own dedicated readout chain. Using larger crystals for each detector increases both fabrication costs and the complexity of electron transport dynamics. In response to these challenges, ongoing research has seen increased investigation into the use of other, more scalable cryogenic detector designs.

Microwave Kinetic Inductance Detector (MKID) design has potential for dark matter detection. MKID designs typically include a thin film of superconducting material patterned onto a semiconductor substrate and capacitively coupled to a feedline. When an alternating current (AC) field is applied to the MKID via the feedline, the inertia of the superconducting charge carriers (referred to herein as Cooper pairs) causes their motion to lag behind that of the driving electric field. This effect lends the film a so-called "kinetic inductance" which, combined with the capacitive coupling, results in a resonant LC circuit (where L represents inductance and C represents capacitance) with high quality (Q) factor. The fundamental frequency and quality factor of the resonance both depend on the ratio of superconducting Cooper pairs to quasiparticles in the substrate. That ratio is theoretically sensitive to the presence of dark matter. Any particle incident on the substrate would generate phonons that could break Cooper pairs into quasiparticles, changing the resonating behavior of the device in quantifiable ways.

One obstacle to using MKIDs in this manner is the incidence of background IR photons onto the superconducting substrate. These photons, which are typically generated by warmer temperature stages of the cryogenic system housing the MKIDs, may travel down to the detector level by hijacking data and power lines. Those with high enough energy may then break apart a Cooper pair into quasiparticles, reducing the resonator's quality factor and consequently its sensitivity. One way to prevent this phenomenon is to place filters on all conducting lines that run from higher temperatures down to the detectors. However, no IR filters of small enough size for this application are currently commercially available.

Accordingly, a need exists for a solution to at least one of the aforementioned challenges in fabricating smaller infrared filters configured to advantageously block IR noise to improve the MKID-based dark matter detector operation.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to epoxy-based inline infrared filter assemblies, and to devices and methods employed in the manufacture and/or use of such inline infrared filter assemblies. While the filter assemblies described herein are described as applied to MKID-based detector design, certain embodiments of the filter assemblies described herein may be used in studies or processes involving high-sensitivity superconducting elements, including the input stage of quantum computers utilizing superconducting qubits.

Certain embodiments are directed to co-axial infrared filters comprising (i) a body having a wall forming a cylindrical cavity, the body having an open first end and an open second end, the body forming an outer conductor; and (ii) a first Subminiature version A (SMA) connector coupled to the first end of the body and a second SMA connector coupled to the second end of the body, the first SMA connector and the second SMA connector being operatively coupled forming an inner conductor positioned along the long axis of the body; and (iii) an infrared absorbing material filling the cavity of the body. The body can be copper or another conducting material. In certain aspects the body has a circular, triangular, square, pentagonal, hexagonal, septagonal, or octagonal exterior surface cross-section. In certain aspects the body has a hexagonal exterior surface.

The inner conductor can have a radius of 0.01 inch to 0.05 inch. In certain aspects the inner conductor has a radius of 0.03+/−0.005 inch.

The radius to an inner surface of the body wall can be 0.100 inch to 0.150 inch. In certain aspects the radius to an inner surface of the body is 0.125+/−0.05 inch. The body wall can have a thickness of 0.1 inch to 0.4 inch.

The cylindrical cavity can be 0.2 inch to 0.5 inch in length. In certain aspects the cylindrical cavity is 0.375+/−0.05 inch in length. The cylindrical cavity can have an inner diameter of 0.150 inch to 0.300 inch. In certain aspects the cylindrical cavity has an inner diameter of 0.200+/−0.05 inch.

The infrared absorbing material can be a magnetically loaded epoxy, which is available from various commercial sources. In certain aspects, the epoxy contains metal filings or particles. In certain aspects the metal is iron or other conducting metal or alloy. The term “epoxy” refers to any resins based on the epoxides; and the term “epoxides” refers to any organic compound with a reactive group consisting of an oxygen atom bonded to two adjacent carbon atoms that are bonded together. The epoxy resins that can be used preferably have an excellent molding property, and include novolak type epoxy resins, cresol novolak type epoxy resins, biphenyl type epoxy resins, triphenol alkane type epoxy resins, heteroglycidic epoxy resins, bisphenol A type epoxy resins, bisphenol F type epoxy resins, naphthalene ring-containing type epoxy resins. In certain aspects the epoxy is a castable epoxy resin (e.g., ECCOSORB® CR).

In certain aspects the SMA connectors are knurled SMA connectors. The SMA connectors are configured to be position inline with the appropriate male/female connections. The filter can further include the appropriate SMA caps coupled to the SMA connectors.

Other embodiments are directed to methods for producing a co-axial infrared filter. The methods can include the steps of (i) preparing a hollow filter body having a first end opening and second end opening by pressing a first SMA connector into the first end opening and pressing a second SMA connector into the second end opening; (ii) forming a continuous conductor along a long axis of the filter body by coupling the first SMA connector and the second SMA connector; (iii) filling the filter body with epoxy precursor materials and allowing the precursor materials to cure forming an epoxy filled filter body. The method can further include positioning the filter body and an SMA connector in pressing jig.

Other embodiments include a jig and methodology of using the jig for fabricating a co-axial infrared filter. The jig includes an SMA connector receiving portion configured to receive a first SMA connector and a second SMA connector, and a filter body receiving portion configured to receive a filter body. The SMA connector and body receiving portions are constructed and arranged to mechanically couple the first and second SMA connectors and the filter body together to form a sealed central cavity within the filter body.

Other embodiments include electronic systems comprising a detector and a feedline, the feedline comprising a coaxial filter as described herein.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions and kits of the invention can be used to achieve methods of the invention.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

Figure 1:
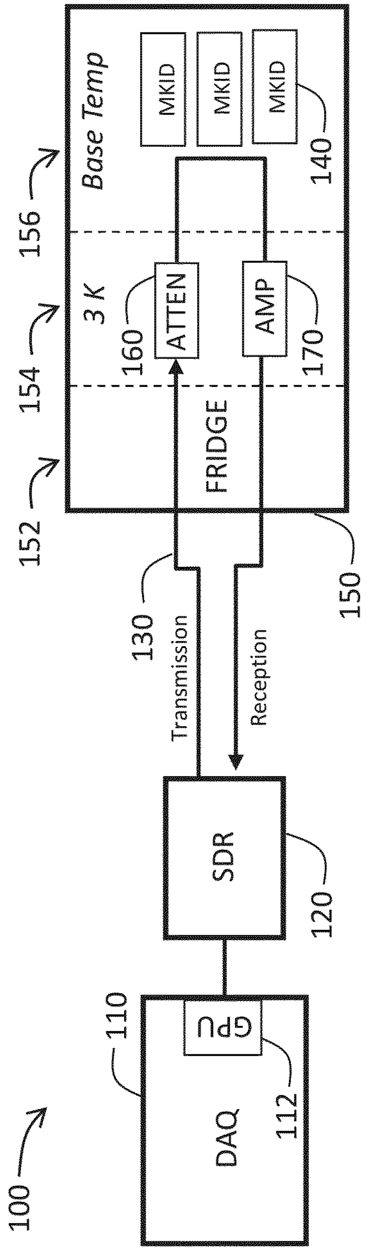
FIG. 1 is a schematic of an exemplary readout electronic system according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

As used herein, the word “exemplary” or “illustrative” means “serving as an example, instance, or illustration.”

Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

As described above, Microwave Kinetic Inductance Detectors (MKIDs) are thin-film superconducting resonators that may be advantageously applied in far-infrared astronomy. At the simplest design level, MKID designs consist of a superconducting film patterned onto a substrate to form inductive and capacitive elements. One example of an MKID may comprise an interdigitated niobium (Nb) capacitor and meandered aluminum (Al) inductor fabricated onto a silicon crystal. The kinetic inductance that gives MKIDs their name comes from the inertia of the Cooper pairs that carry superconducting current inside the film. In the presence of an alternating electric field, the mass of these pairs causes their motion to lag behind that of the field. This kinetic inductance combines with the geometric inductance (L), capacitance (C), and film surface resistance (R) to form an RLC circuit with resonating behavior. Both the characteristic frequency and sharpness of that resonance are derived from the system's complex inductance and resistance.

These properties of an MKID may be observed via stimulation by a feedline that couples with its capacitive element in an electrical system. Like the capacitor, the feedline may comprise Nb in order to be insensitive to phonons due to Nb's higher gap energy. If the feedline signal's frequency is near the resonance of the MKID, a large current will be excited in the detector. By energy conservation, this excitation will be accompanied by a corresponding drop in the signal strength inside the feedline. Thus, the ratio of the feedline's output signal strength to the strength of the initial excitation depends on the distance between the excitation signal frequency and the MKID resonance frequency. Viewing this electrical system as a two-port network, with the feedline input as Port 1 and the feedline output as Port 2, this ratio is equivalent to the power transferred from Port 1 to Port 2 (defined as the S21 transmission parameter). Measurements of the S21 (power transmission) value over a range of frequencies may be plotted as a "notch" (approximating an upside-down bell curve), the shape and location of which changes as a function of temperature because an increase in temperature breaks Cooper pairs in a roughly similar way to a particle incident on the detector.

Breaking Cooper pairs into quasiparticles impacts multiple characteristics of the detector. First, the surface resistance of the film increases because there are more electrons in a normal conducting state. This increases the damping of the resonant behavior, leading to a smaller resonance peak (e.g., both the depth and sharpness of the notches decreasing at higher temperatures). Second, and less intuitively, the kinetic inductance of the detector increases because of pair breaking. Because pair breaking leaves fewer charge carriers available to sustain the superconducting current excited by the feedline, the kinetic energy of each pair must increase and, with it, the lag between driving current and charge carrier motion. This increased inductance decreases the device's resonant frequency, which manifests in a leftward shift in plotted notch position.

A total quality factor $Q_r$ of the resonance of an MKID design may be split into two factors: the internal quality factor of the resonator $Q_i$ and the coupling factor $Q_c$ describing the energy loss between resonator and feedline. $Q_i$ is sensitive to the quasiparticle density inside the superconducting film. That quasiparticle density is affected by two factors: the non-zero temperature of the superconductor and the total rate of incident pair-breaking events. The first factor may be treated as effectively constant for the purposes of analyzing MKID responsivity. The second is responsible for the MKID design's utility as a detector. More specifically, because the change in transmission behavior of an MKID design may be shown to be proportional to the square of that design's overall quality factor $Q_r$, any decrease in an MKID design's quality factor $Q_r$ may significantly decrease the design's sensitivity as a detector. One important design constraint is that the feedline power itself breaks a number of Cooper pairs during readout, proportional to the power of the feedline signal and the overall quality factor of the resonator. Past a certain density, these quasiparticles may substantially decrease the internal quality factor $Q_i$, an effect that sets an upper limit on readout power. Also constraining design, the overall readout noise is typically dominated by the post-device low-temperature amplifier which has noise inversely proportional to the readout power. Together, these two competing constraints define an optimum readout power that minimizes amplifier noise while also not creating too many temporary quasiparticles. The value of this optimum power may be expressed as a proportion of an MKID design's coupling factor $Q_c$ to its overall quality factor $Q_r$, as follows (Equation (1)):

$$\frac{Q_c}{Q_r^2} \tag{1}$$

As illustrated in FIG. 1, reading out the properties of an MKID detector design may be accomplished using an exemplary dedicated chain of readout electronics 100. The more complex electronics, comprising a data acquisition (DAQ) computer 110 and a software-defined radio (SDR) 120, both sit at ambient room temperature. The SDR 120 is connected to both a transmission end (outgoing) and a reception end (incoming) of a data line 130, so that SDR 120 may generate the initial feedline signal to an MKID(s) 140 and may read out the resulting output signal to calculate S21 for the MKID(s) 140. The SDR 120 may be controlled by a server running on a graphics card GPU 112 of the DAQ 110, through which a wide array of measurement scripts and protocols may be executed.

The data line 130 itself may be a simple Subminiature version A (SMA) line configured to run through each temperature stage of a cascade refrigeration system 150 such that the data line 130 connects to the input of the on-chip feedline, connects to that same feedline's output, then runs back up to the ambient room temperature environment. The exemplary temperature stages 152, 154, 156 shown in FIG. 1 are typical of known cascade refrigeration system 150 designs. On the input side, an attenuator 160 may be placed at a 3 degrees Kelvin (K) stage 154 to prevent large powers generated by the room-temperature SDR 120 from overloading the cryogenics of the fridge 150. Then, an amplifier 170 may be placed on the output side at the 3 K stage 154. Without such separation, the resonance characteristics of the MKID(s) 140 positioned within a base temperature stage 156 may be overwhelmed by thermal noise contributed by warmer temperature stages 152, 154.

As described above, higher quasiparticle densities reduce a detector's sensitivity, creating a design incentive to minimize the number of quasiparticles in the superconducting film. The readout scheme 100 of FIG. 1 presents an obstacle to that minimization: specifically, the necessary injection of a signal on a continuous data line 130 running from room temperature all the way to the MKID 140 device's location at base temperature 156. General-purpose attenuators (like exemplary attenuator 160) have no effect on frequencies as high as the infrared, so the feedline 130 effectively acts as a path for blackbody radiation generated at every temperature 152, 154 above base temperature 156 to reach the detector chip(s) 140. Regardless of the specific superconducting material being used in an MKID, a majority of infrared photons will have energy greater than or equal to twice the supercomputing gap energy and, consequently, any infrared photons that reach the detector 140 may be able to generate quasiparticles in the substrate. Therefore, one object of the present invention is to filter out these infrared photons to achieve substantial MKID performance improvement.

While some population of quasiparticles is inescapable at any temperature above absolute zero, an appreciable fraction of those quasiparticles present at experimental temperatures are generated by the background level of incident photons. Thus, efforts to advantageously increase MKID sensitivity may benefit from strategies for better insulating the superconducting film from any photons energetic enough to break Cooper pairs. Light-tight detector shielding may minimize the incidence of optical and higher-frequency light, but the data readout lines must necessarily pass through such shielding and provide a path for infrared photons to reach the detector from warmer stages of a refrigerator. One solution is to place filters on the data transmission line, generally at a 3 K stage or below, to block these infrared photons. Fabrication of custom small inline filter assemblies that exhibit the electrical characteristics necessary to block infrared photons and at the required specifications is an area of ongoing research in the art. To date, efforts to inject into custom filter enclosures some type of loaded epoxy compound designed to absorb microwave frequencies have resulted in attenuation far past the region necessary for IR filtration.

Figure 2A:
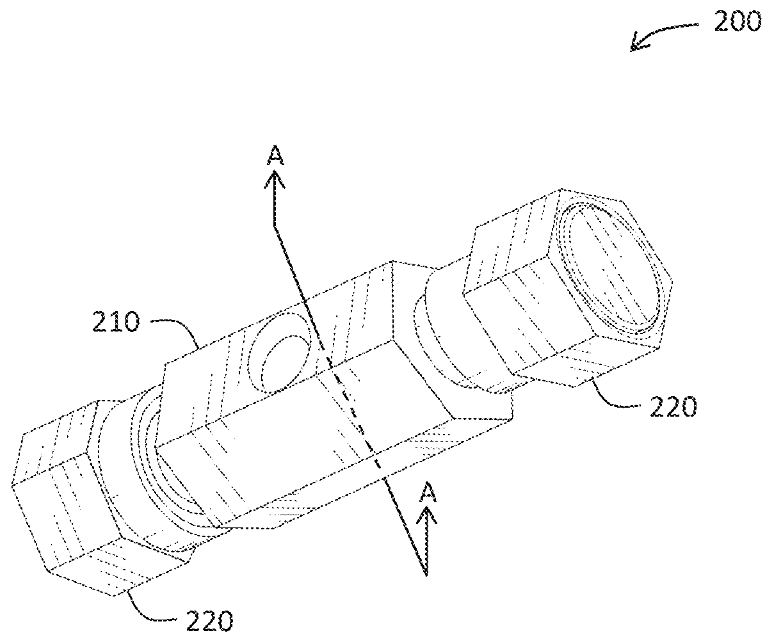
FIG. 2A is a perspective view of an epoxy-based infrared filter assembly according to an embodiment of the present invention.
Figure 2B:
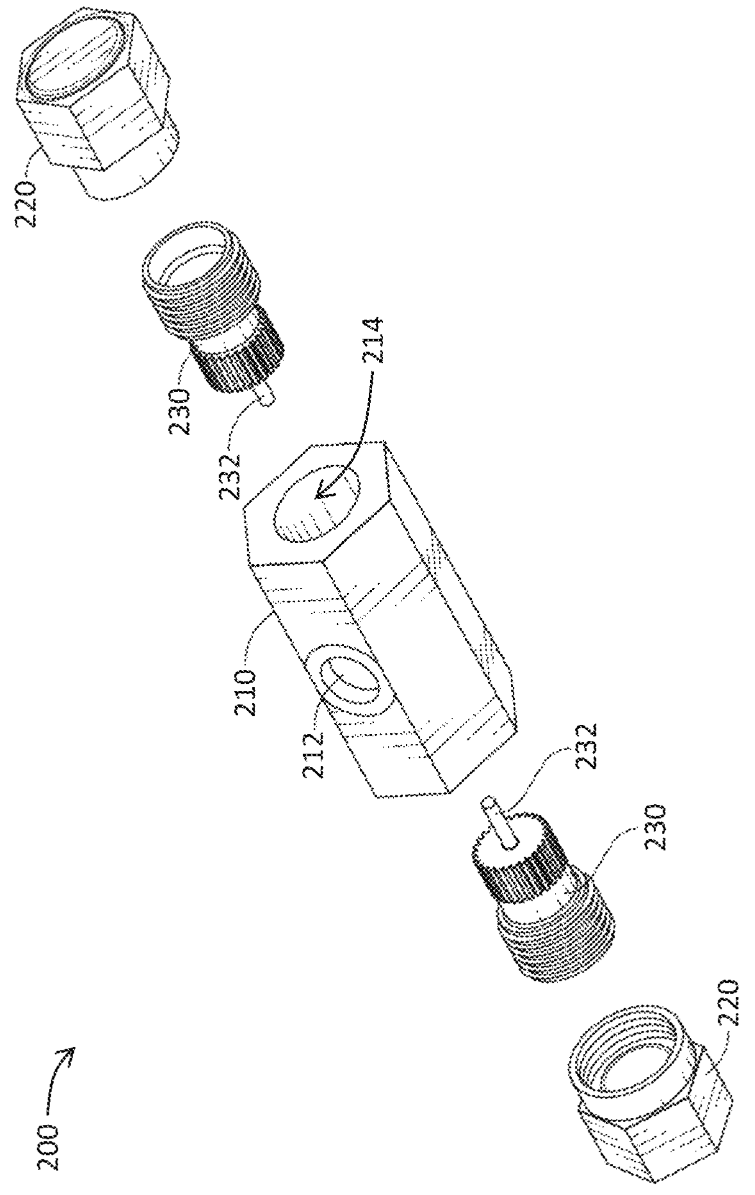
FIG. 2B is an exploded perspective view of the epoxy-based infrared filter assembly of FIG. 2A.

Referring now to FIGS. 2A and 2B, an epoxy-based infrared filter assembly 200 according to an embodiment of the present invention will now be described in detail. For example, and without limitation, such a filter assembly 200 may comprise a substantially cylindrical filter body 210 characterized by an axially positioned void, also referred to herein as a central cavity, that presents opposing holes 214 on each end of the filter body 210. These two holes 214 may be configured to receive respective SMA connectors 230 such that respective protruding pins 232 of the SMA connectors 230 may be positioned proximate each other within the central cavity of the filter body 210. The filter body 210 also may comprise a filling hole 212 positioned along an outer surface of the filter body 210 to present an access port for filling the central cavity with epoxy and/or for facilitating visualization and/or physical manipulation of components positioned inside the central cavity. For example, and without limitation, a manufacturer may insert an appropriate tool into the filling hole 212 to solder together the protruding pins 232 of the SMA connectors 230 to form an inner conductor (as described in more detail hereinbelow) before using that same filling hole 212 to pour epoxy into the central cavity. The filling hole 212 may itself serve as a fill line to indicate the central cavity is full of epoxy.

Figure 3:
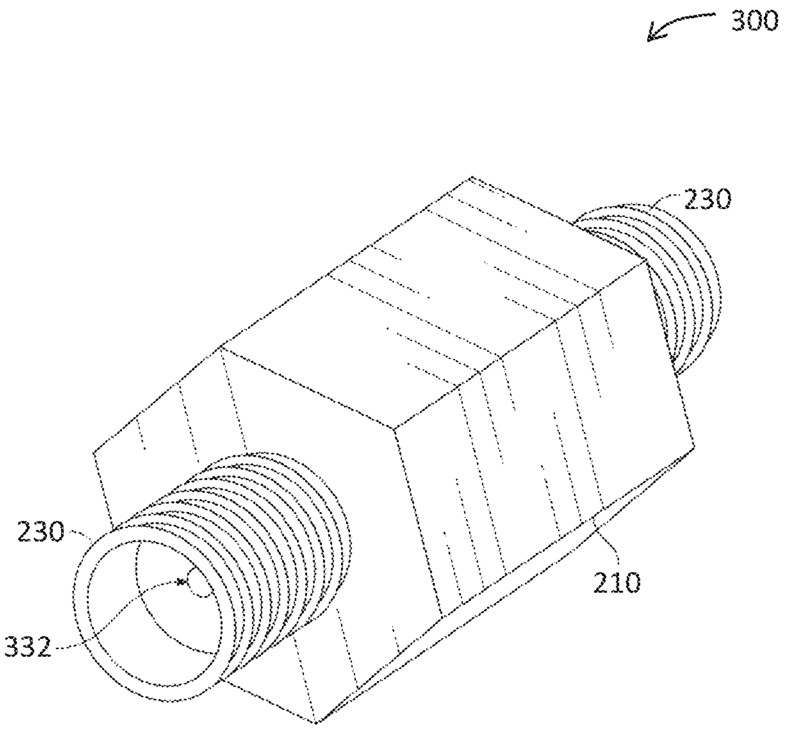
FIG. 3 is an inverted perspective view of the assembled filter body and connectors of the epoxy-based infrared filter assembly of FIG. 2A.

Still referring to FIGS. 2A and 2B, and referring additionally to FIG. 3, certain embodiments of the present invention design may employ SMA caps 220 to protect the SMA connectors 230, for example, and without limitation, during the filter assembly 200 manufacturing process (described in more detail hereinbelow). FIG. 3 illustrates an inverted and assembled view 300 of the filter body 210 with the filling hole 212 not visible (i.e., positioned on an underside of the filter body 210) and with two SMA connectors 230 pressed fittedly into the respective opposing holes 214. The exemplary filter body 210 design of FIGS. 2A, 2B, and 3 is shaped hexagonally and configured to present respective female threaded ends of the two SMA connectors 230 for connection inline to complete an SMA data line (not shown) to be filtered. One advantage of a hexagonal exterior over, for example, a circular exterior is ease of threadedly screwing data line connections on and off from the SMA connectors 230 on each side of the filter assembly 300. Note: A person of skill in the art will immediately recognize that each or both of the two SMA connectors 230 may present a male end(s) for connection inline to complete an SMA data line.

Figure 4:
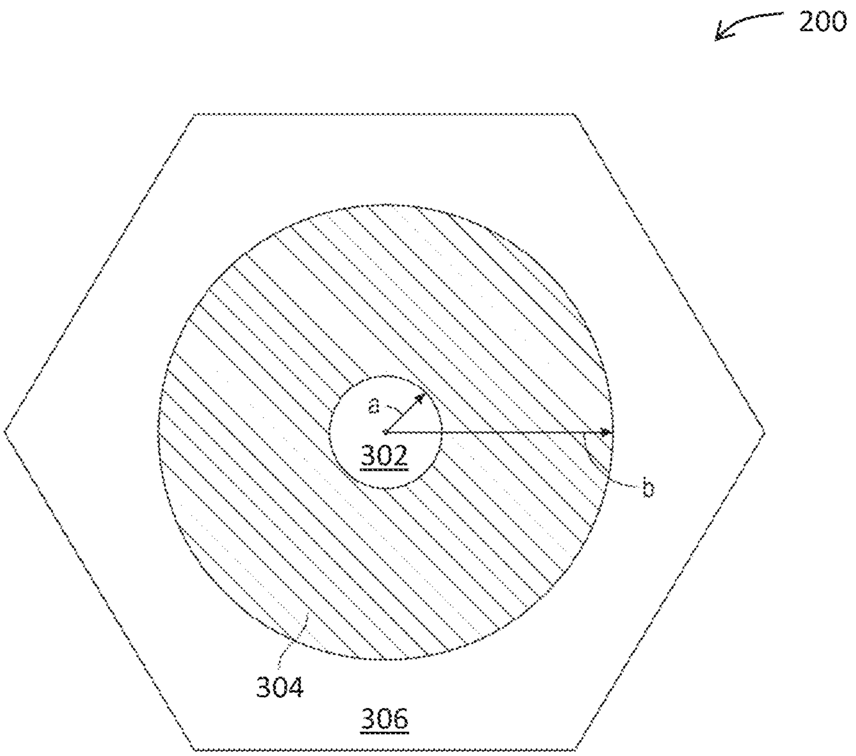
FIG. 4 is a cross-sectional illustration of the epoxy-based infrared filter assembly of FIG. 2A with the view taken along reference line A-A of FIG. 1.

Referring now to FIG. 4, and still referring to FIGS. 2A, 2B, and 3, a core concept for creating an epoxy-based filter according to certain embodiments of the present invention may be based on a coaxial design characterized by a dielectric epoxy 304 (e.g., castable epoxy resin) introduced to separate an inner conductor 302 (e.g., formed by joining inner protruding pins 232) from an outer conductor(s) 306 (e.g., the filter body 210). The radii of the inner conductor 302 (*a*) and outer conductor 306 (*b*) may determine a passband range of the filter assembly 200, which may be 4-8 GHz for many relevant MKIDs. The length of a coaxial segment may determine an overall attenuation of the filter assembly 200, with longer sections of epoxy leading to a more attenuated signal. For the present dark matter application, shorter lengths may generally be chosen to maximize transmission in the passband. Typically, each end of the coaxial segment may be defined as an inner surface of a female end of each SMA connector 230 whose respective outer pin 332 terminates the inner conductor 302, fixing the value of radius (a) at 0.03 inches. The ideal outer radius (b) for minimizing reflection in the 4-8 GHz range may be found, as known in the art, by calculating the impedance of a dielectric-filled coaxial cable using Equation (2), as follows:

$$Z = \sqrt{\frac{\mu_0}{\epsilon_0}}\sqrt{\frac{\mu_r()1 - i\tan\delta_m)}{\epsilon_r(1 - i\tan\delta_d)}}\ln\frac{b}{a} \tag{2}$$

where relative permeability $\mu_r$, relative permittivity $\in_r$, magnetic loss tangent $\delta_m$ and (di)electric loss tangent $\delta_d$ are known frequency-dependent quantities of an epoxy mix used in certain embodiments of filter assembly designs of the present invention (for example, and without limitation, the commercial mix ECCOSORB® CR-110). The corresponding value for the outer radius that minimizes the impedance mismatch between Z and the standard 50Ω2 SMA cable in the operating range may be b=0.125 inches.

In certain embodiments of the present invention, two coaxial epoxy-based copper filters may be configured to advantageously block infrared signal while minimizing reflection at the intended operating range of 3-4 GHz. Conforming filter assemblies may be made by inserting connectors, such as commercially available Pasternak® SMA connectors, and an epoxy mix (for example, Laird ECCOSORB® epoxy mix) into the custom machined filter body 210 of FIGS. 2A, 2B, and 3.

Two inline filter design challenges include shape and length. More specifically, the first challenge speaks to whether altering the outside shape of the filter might have adverse impacts on the filter's performance. The second challenge speaks to whether changing the length of the coaxial segment (equivalently, the length of the cavity filled with epoxy) might provide an avenue for further improving the filter's performance. The operating lengths of certain filter designs of the present invention may be partially set by the length of the SMA connector pins employed, selection of which may be based on the requirement that these pins meet in the middle just under the filling hole with a small gap left between for soldering. Should a different length produce otherwise desirable electrical performance (e.g., higher transmission and lower reflection in the 4-8 passband region), altering the length of these pins may be a cumbersome but worthwhile step of the assembly process.

To explore the effect of changing different parameters such as overall length and filter shape, advanced full-wave electromagnetic simulation using the finite element method (FEM) was applied to analyze various filter designs. Graphs illustrating simulation results of interest are shown in FIGS. 5, 6, 7 and 8.

For the simulation runs, the material properties provided by the epoxy manufacture were programmed in, along with those for copper (for the filter bodies 210), Teflon, brass, and gold (for the SMA connectors 230). Then, two wave port excitations were applied to each end of the coaxial segment. The solver was configured to assume that each port connected the filter to a semi-infinitely long waveguide that had the same cross-section and material properties as the port. The outside edge of the port defined the ground plane (in this case, the filter exterior) and the inside edge outlined the signal conducting volume (in this case, the conducting pins). The excitation input impedances were set to 50Ω to match that of a standard SMA cable, and the excitations' frequencies were varied from 0 to 30 GHz. The voltages resulting from each excitation were measured at both the exciting port (to calculate reflection) and the port on the opposite side (to calculate transmission).

Figure 5:
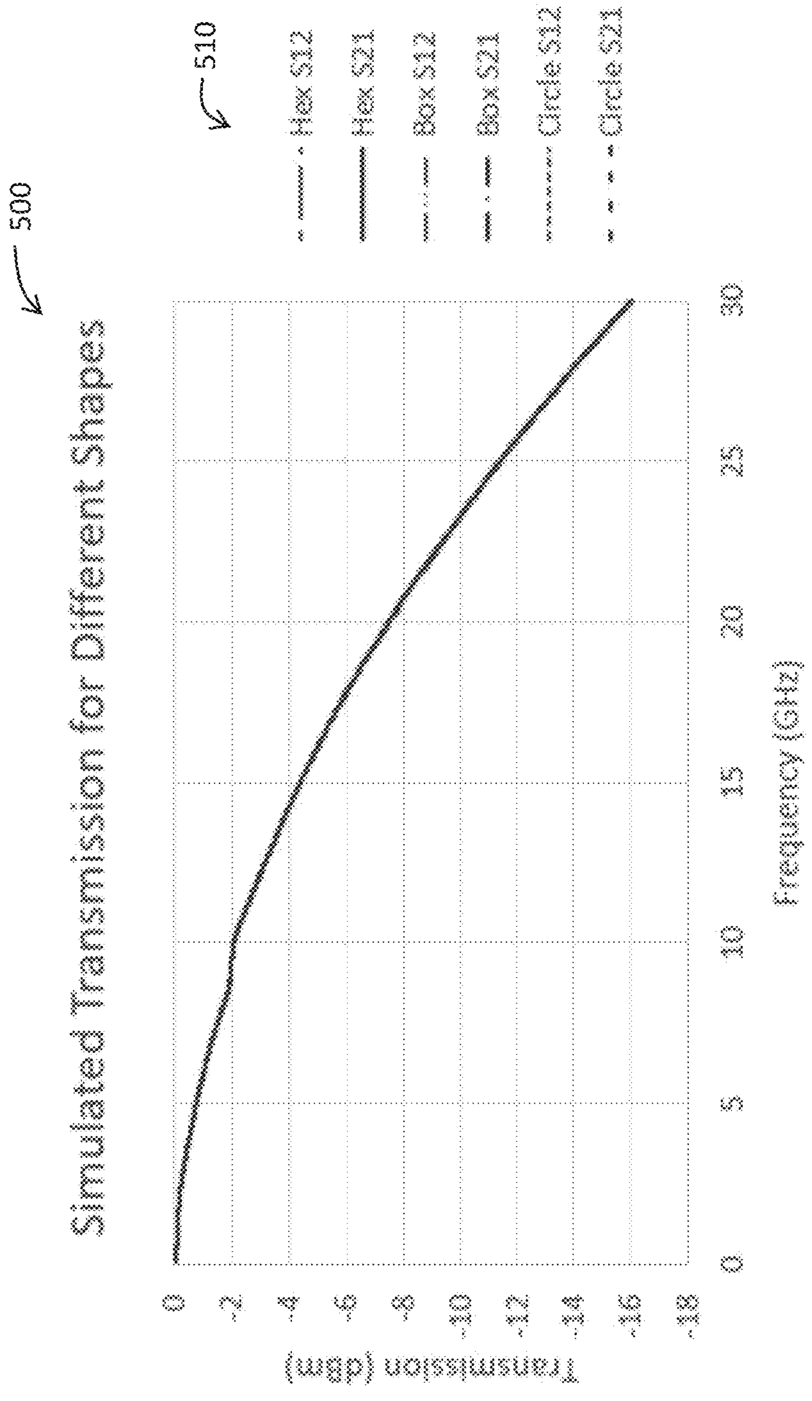
FIG. 5 illustrates results of simulated transmission for modeled filter shapes according to certain embodiments of the present invention.

The result of simulated transmission for different shapes is illustrated in graph 500 of FIG. 5. For each shape scenario simulated 510, the S21 term represents the ratio of voltage observed at port 2 due to voltage created at port 1, the S22 term represents the ratio of voltage observed at port 2 due to voltage created at port 2, and so on. Three different filter shapes were tested: box, circle, and hex (Note: the non-hexagonal models nonetheless followed the coaxial shape of FIG. 4, only with different shapes replacing the hex outer surface). The results showed the outside shape may be modified to fit different applications without significantly affecting the electrical performance (e.g., transfer functions) of the filter design. Graph 500 illustrates that the transmission is effectively identical for all three shapes at all frequencies.

Figure 6:
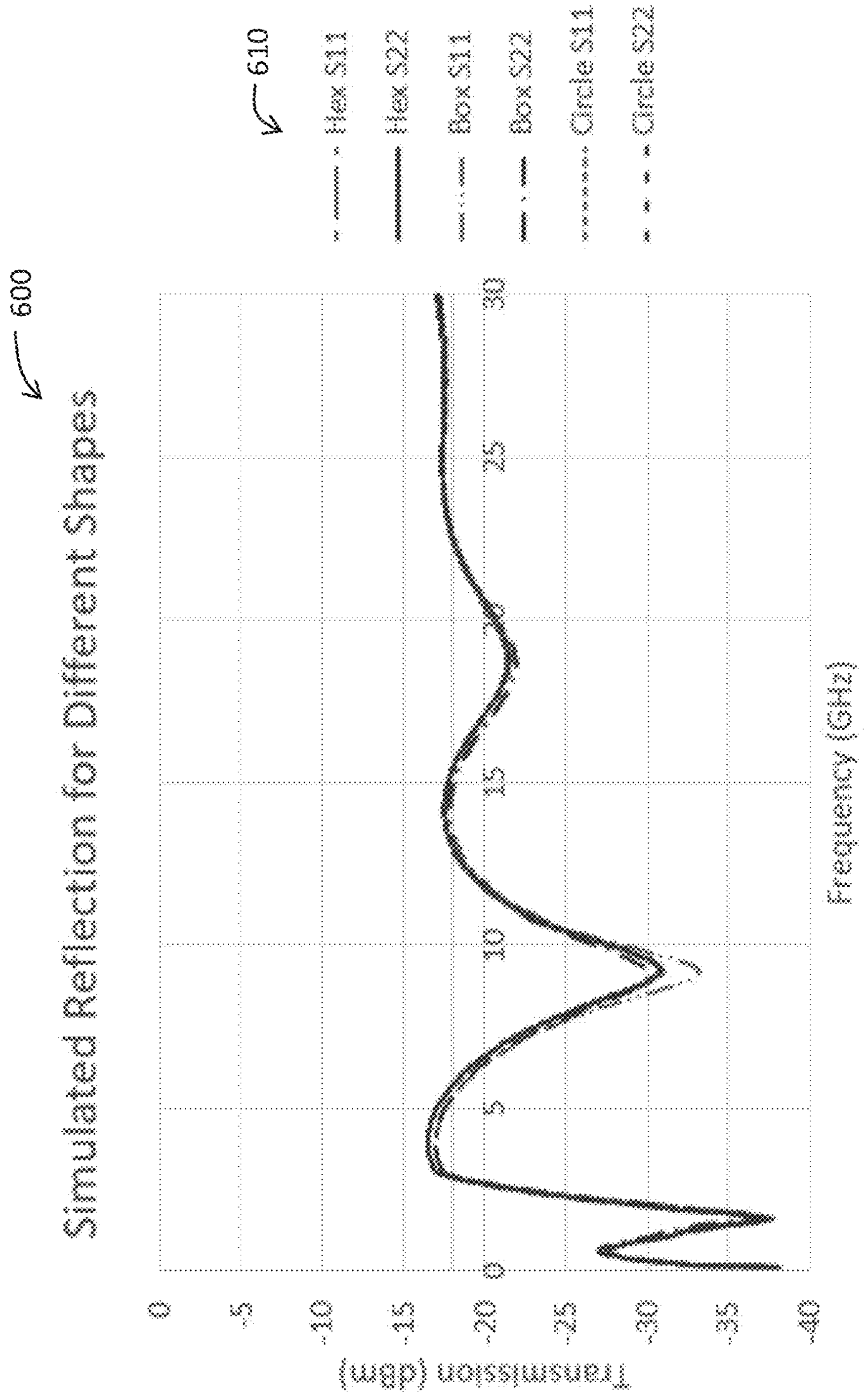
FIG. 6 illustrates results of simulated reflection for modeled filter shapes according to certain embodiments of the present invention.
Figure 7:
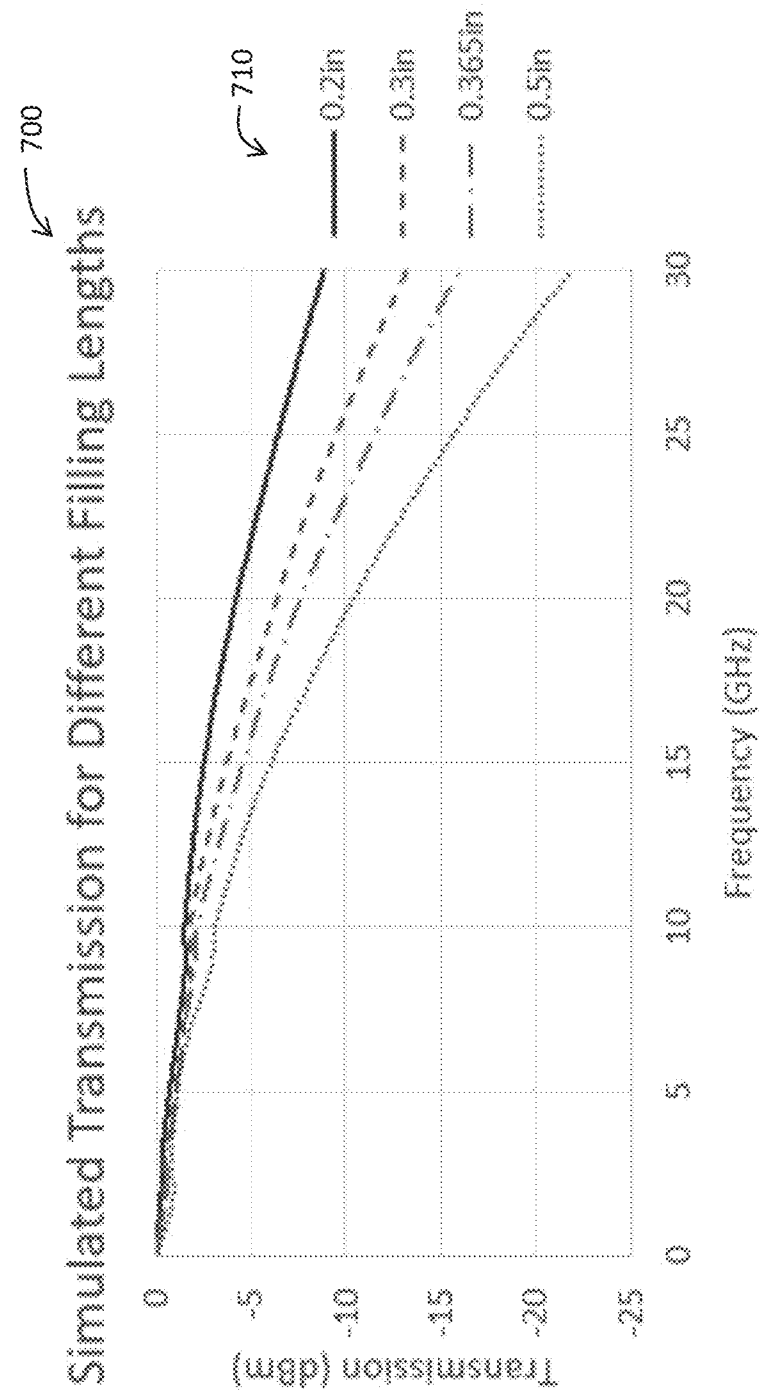
FIG. 7 illustrates results of simulated transmission for different filling lengths according to certain embodiments of the present invention.
Figure 8:
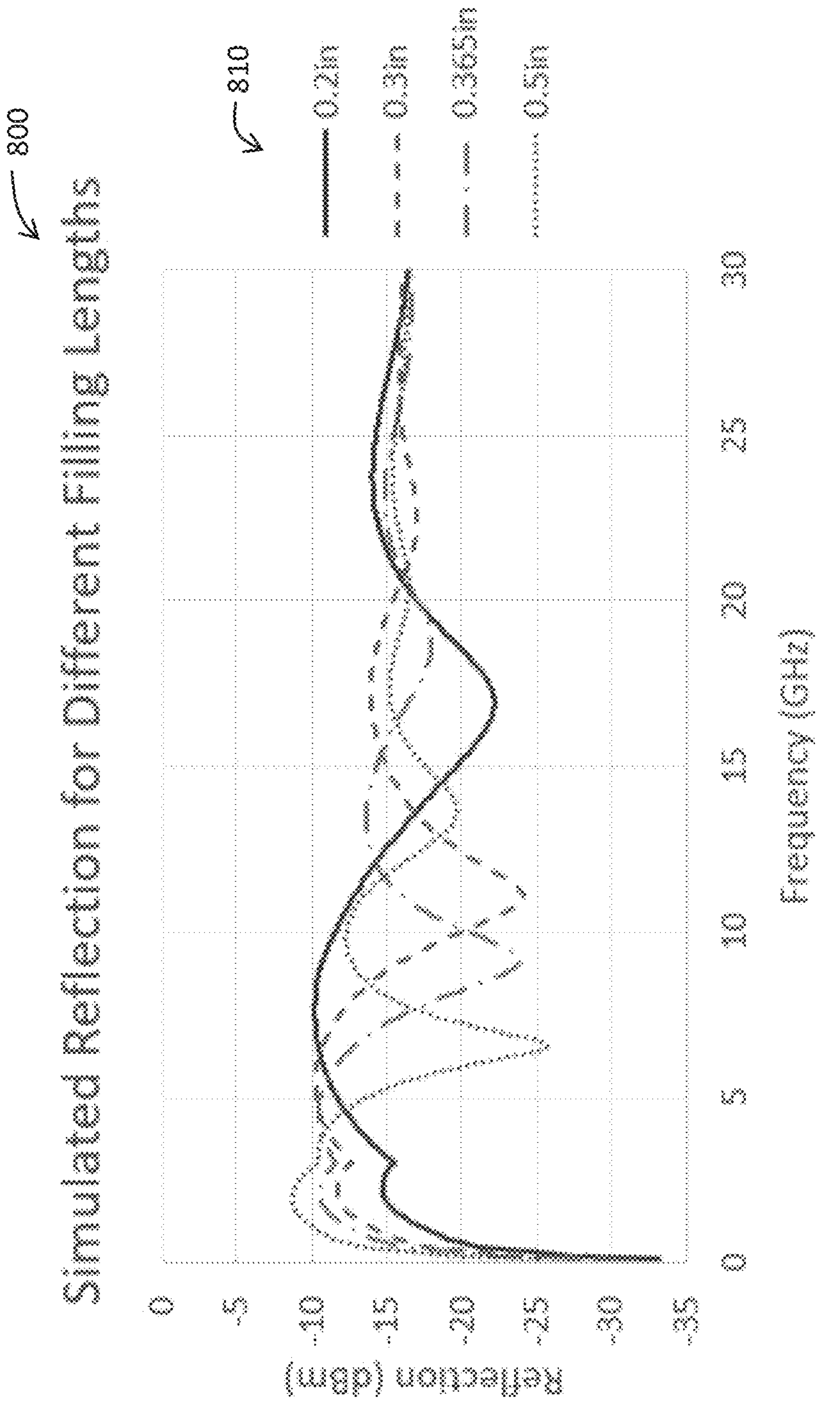
FIG. 8 illustrates results of simulated reflection for different filling lengths according to certain embodiments of the present invention.

The result of simulated reflection for different shapes is illustrated in graph 600 of FIG. 6. As shown, the magnitude of the reflection varies slightly between the three shape scenarios 610 at a few frequencies, but the reflection plot shape remains substantially constant. At a practical level, these data imply that changing the outside shape of the filter does not significantly impact filter performance.

Some interesting features do jump out from this first set of transmission 500 and reflection 600 curves. First, the sum of the two is not equal to 0 dBm across all frequencies as one might initially expect but is instead always <0 dBm and varies across the frequency range. This behavior may be attributed to the effects of dielectric (and, to a lesser extent, magnetic) loss. Those values become significant at higher frequencies, the same range where the difference between the coefficient sum and unity is most pronounced. Second, the transmissions measured in opposing directions (S21 and S12) through the filter are identical, while the reflections measured at each end (S11 and S22) for the box differ slightly. Reflecting the measurements across the filter's midpoint should not affect these values, because it is symmetric through that plane. Therefore, the transmission is behaving as expected, but the reflection is producing some small anomalies. This observation is most likely due to the error introduced by the finite element solving method; specifically, one end of the filter was placed at the origin, so each end was treated slightly differently by the simulator even though they were physically identical. This effect was most pronounced for the box filter likely because that shape had the least symmetric cross-section and was thus more difficult for the simulator to solve.

Following the shape study, the full version of an exemplary filter assembly (with the outer shape arbitrarily chosen to be the box) according to an embodiment of the present invention was similarly modeled in simulation. SMA connectors 230 were pressed into opposing holes 214 of the box shaped filter body (not shown) and their accompanying Teflon dielectric. The length of the center cavity (e.g., epoxy chamber) of the filter body was varied around the initial value of 0.365 inches (determined by the SMA pin 232 length). The results are shown in graph 700 of FIG. 7 and graph 800 of FIG. 8, and clearly demonstrate that the filling cavity length scenarios 710, 810 affect both the transmission and reflection characteristics of the filter. As graph 700 illustrates, shorter lengths correspond to higher transmissions, which makes intuitive sense given that longer lengths lead to larger attenuations. However, considering graph 800, the shift in harmonic reflection behavior between filters of different lengths was more of a surprise, as the length of the filter appears nowhere in the theoretical impedance expression for a coaxial filter. Nonetheless, shorter filling lengths clearly shift the reflection peaks and troughs towards higher frequencies.

Overall, the numerical differences in performance are small between filters with different filling lengths. The increase in transmission from shortening that length amounts to a fraction of a decibel in the range of operating frequencies, and the shifts in reflection behavior are not particularly advantageous or disadvantageous within that same range. Because of this, certain embodiments of the present invention may employ the original filling length of 0.365 inches. Additional reasoning behind this design decision include, for example, and without limitation, that the process of shortening the SMA pins to accommodate a shorter filling length may be difficult, time-consuming, and likely to create imperfections that could offset any increases in performance due to the change.

Regarding filter body shape, hex form-factor filters may be more versatile than the box type. For example, and without limitation, hex filters do not need an adapter plate to mount into a refrigerator (as do box type filters). Additionally, a sloped edge may be added to the filling hole to address problems with adding the epoxy to the filling cavity.

Figure 9A:
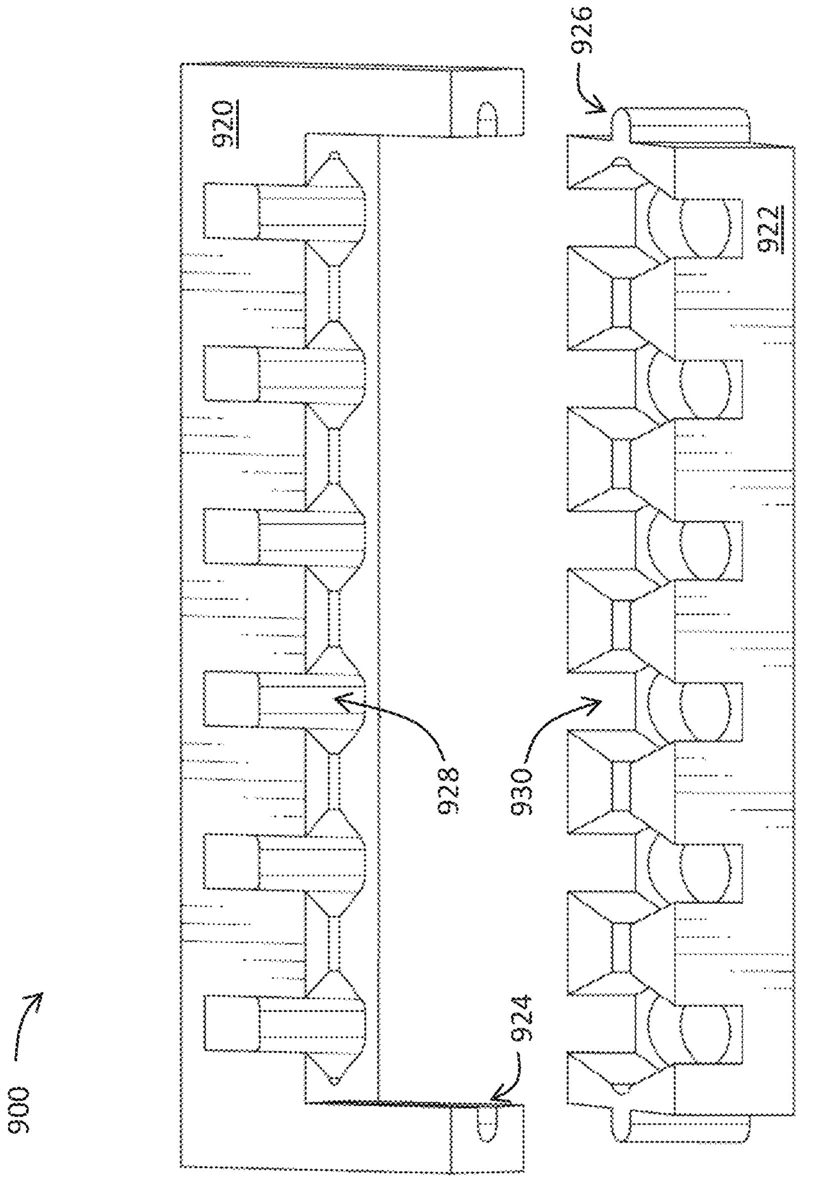
FIG. 9A is a custom jig for pressing hexagonal filter bodies and associated connectors according to an embodiment of the present invention.
Figure 9B:
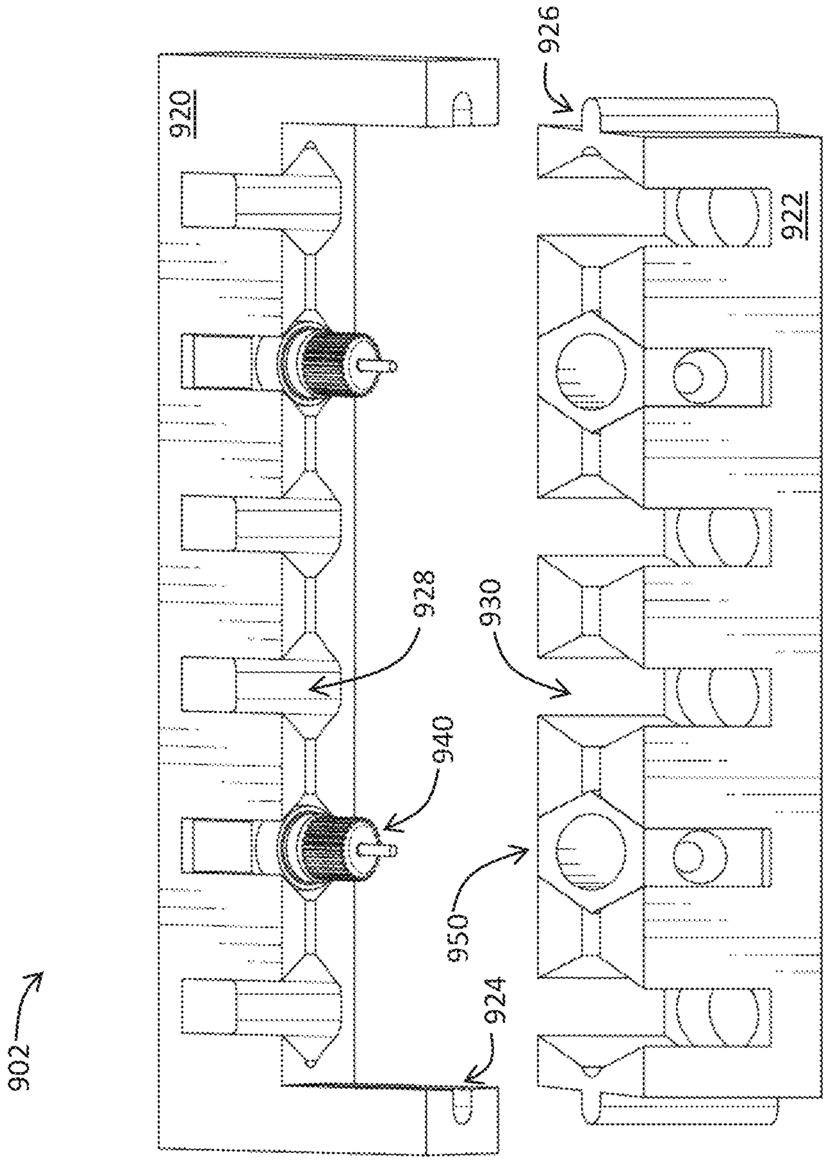
FIGS. 9B and 9C illustrate exemplary operation of the custom jig of FIG. 9A.
Figure 9C:
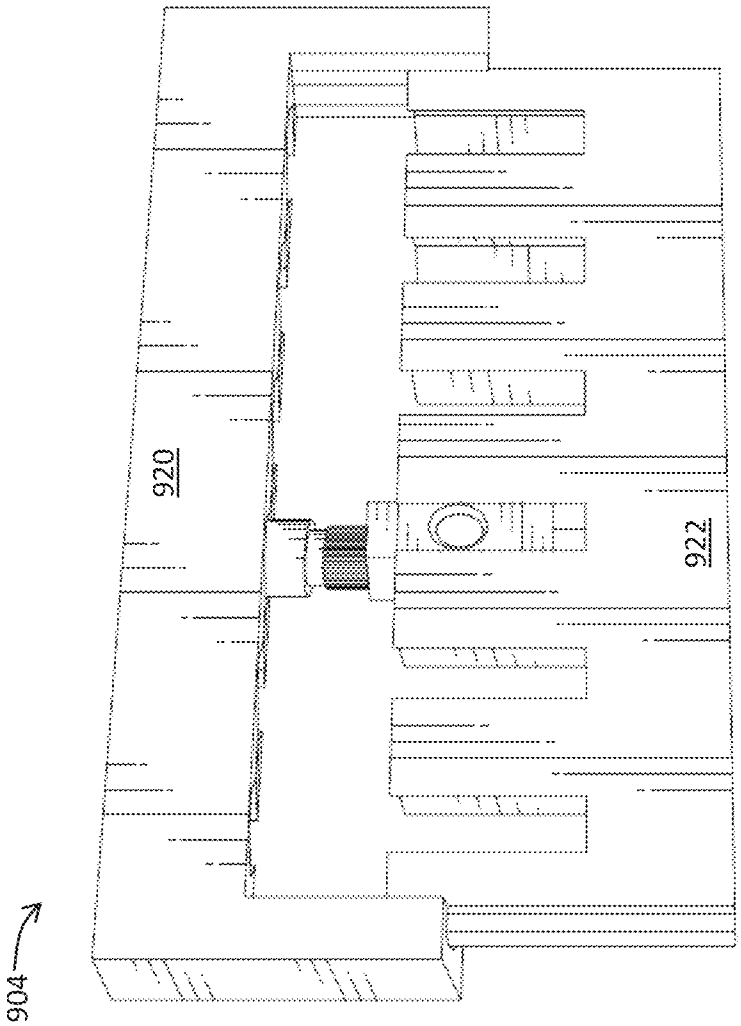

Referring now to FIGS. 9A, 9B, and 9C, custom jigs configured to facilitate insertion of SMA connectors into hex form-factor filter bodies will now be described in detail. For example, and without limitation, FIG. 9A illustrates a custom jig 900 including a SMA connector receiving portion 920 and a hex filter body receiving portion 922 configured to press one or more SMA connectors and respective filter body(s) together to form a sealed central cavity within each filter body. The jig portions 920, 922 may interface via a groove 924 and tab 926 interface. Referring additionally to FIG. 9B, the SMA connector receiving portion 920 may be configured with one or more SMA connector slots 928 each configured to receive a respective SMA connector 940 for positioning and aligning with a paired filter body 950. The hex filter body receiving portion 922 of the jig 900 may be configured with one or more filter body slots 930 each configured to receive a hex filter body 950 for positioning and aligning with a respective paired SMA connector 940. Referring additionally to FIG. 9C, a first pressed filter body may be defined as a hex filter body 950 without any connectors attached; and a half-pressed filter body may be defined as a hex filter body without only one connector (and, optionally, a connector cap) attached. Each hex filter body slot 930 may be configured to receive a first pressed filter body or a half-pressed filter body without damaging the connector during subsequent pressing. In embodiments that employ the connector cap, flipping the half-pressed filter body for fitting into the pressing jig 920 may require this cap be removed in order for the already attached connector to fit into inset holes in the base of the hex filter body slot 930 of the receiving jig 922.

In certain embodiments of the present invention, the filter body may be made from a conductor. In other embodiments, the filter body may be made of a conducting metal such as copper. Still referring to FIG. 9C, the SMA connectors may be "pressed" into each side of the filter body as shown in schematic 904. In certain aspects, the SMA connectors may be pressed between two custom machined copper jig portions 920, 922 using a bench vice. The tab 926 and groove 924 alignment of the jig portions 920, 922 may advantageously facilitate SMA pin alignment inside the central cavity. After the SMA connectors are in place, the connector's pins may be soldered together in the middle of the central cavity of the housing filter to form a continuous inner conductor with the filter body forming the outer conductor of the coaxial design. Epoxy or a similar substance may be prepared and injected into the hollow cavity of the filter body and heat cured.

Assembling inline infrared filters according to certain embodiments of the present invention may comprise three main steps. First, connectors (e.g., knurled SMA connectors) may be pressed into each end of a hollow filter body having two openings on either end of the filter body and each configured to receive and retain a respective connector and to form a seal. Once connectors are in place, the ends of the connector pins protruding inside the filter body may be coupled (e.g., soldered together), forming an inner conductor portion of the coaxial filter design. The cylindrical cavity of the filter body around the inner conductor portion may be filled with liquid epoxy and cured. For example, and without limitation, the materials employed for this process may include (i) Amphenol® 202112 SMA caps, (ii) Pasternak® PE44241 knurled press-in SMA connectors, (iii) Hex-form copper filter bodies, (iv) Hex filter pressing jig, and (v) a SMA connector pressing jig, along with solder paste and epoxy components (e.g., two-part ECCOSORB® CR-110 ingredient kit (Part X and Part Y)). Laboratory tools that may be used include a bench vise, multimeter, soldering iron, hot plate, scale, standard weighing tins, mixing sticks, plastic pipettes, vacuum chamber, and/or an oven. A fume hood or other ventilation method may be advantageous for all steps that involve heating epoxy.

Figure 10:
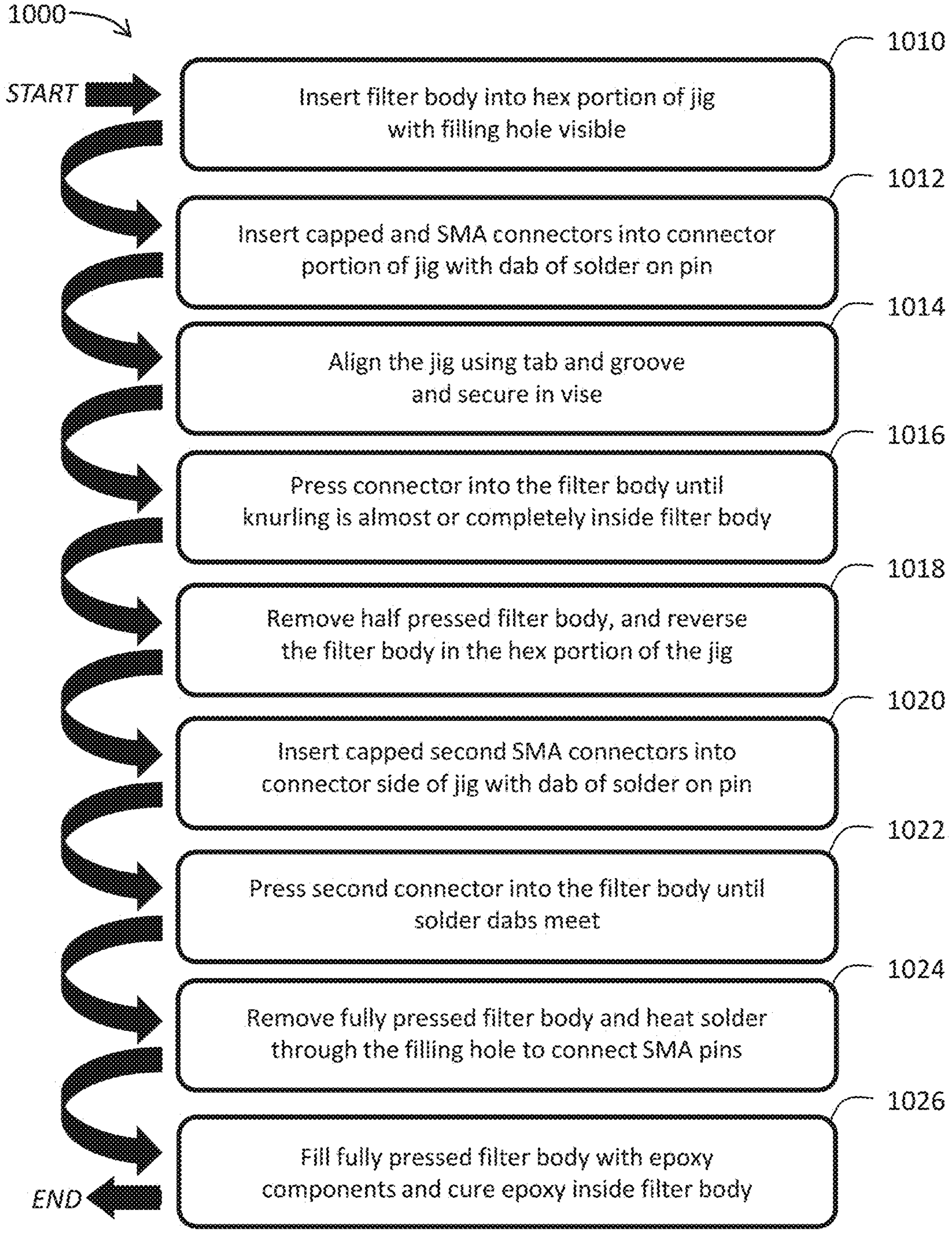
FIG. 10 is a flow chart illustrating an exemplary process for manufacturing an epoxy-based infrared filter assembly according to an embodiment of the present invention.

One example of an epoxy-based infrared filter assembly manufacturing process 1000 is summarized and illustrated in FIG. 10. During this process, a pair of pressing jigs are used to correctly align and insert connectors (e.g., knurled SMA connectors) into opposing ends of a substantially cylindrical enclosure (e.g., filter body). The pressing jigs are configured to advantageously ensure that the inner pins of the connectors remain coaxial. Pins that are not aligned with each other can degrade the filter's performance and, in severe cases, cannot be soldered together.

From the start of fabrication process 1000, a preliminary step to the pressing stage may be to wipe down the filter bodies/enclosures, connectors, and caps with a solvent such as isopropyl alcohol (IPA). Then, the SMA connectors optionally may be prepared by screwing on caps to protect the connector threading during the pressing process. A small dab of solder paste may be placed on the end of each connector pin. (Note: Not much paste is needed, and it is important to ensure paste does not stick far enough to the side to touch the filter body wall and potentially cause a short during filter assembly operation).

For pressing, Step 1010 involves inserting one or more partially assembled filter bodies into a jig configured for pressing. In certain embodiments, the partial filter assemblies (i.e., one connector inserted) may be inserted with their filling holes visible, as doing so may be useful for knowing how far into the central cavity to press each connector's pin.

At Step 1012, one or more SMA connectors may inserted into the corresponding slots on the complementary jig. The jig portions may slide together employing a tab and groove system, and the assembled jig may be secured on a bench vise (Step 1014). Depending on the type of vise, it may be necessary to elevate the entire assembly up off of the base to ensure that the top and bottom edges of the jig portions are put under equal pressures. Then, at Step 1016, the vice-manipulated jig portions may slowly press the connectors into the filter enclosures. Care may be taken to ensure none of the connectors have skewed off-center, as pressing is a non-reversible process and a filter body with an improperly inserted connector is often unusable. Pressing may stop when the knurling at the top of the connector body is almost or completely inside the filter body. At this point the solder paste at the end of each connector pin should occupy roughly the center of the filling cavity as judged through the filling hole. Some connectors may have become more inserted than others due to small variations in size and/or fit into the jigs. This problem may be corrected by either intentionally placing the assembly off-center in the vice to apply more pressure to one side or by finishing the press for individual filters without the jigs.

At Step 1018, the half-pressed enclosures may be taken out of the jigs. The SMA caps may be temporarily removed, and the filter bodies/enclosures may be reversed and reinserted into the pressing jig. New SMA connectors, with a dab of solder paste on their pins, may be added to the smaller jig (Step 1020) and then may be inserted into the enclosures as before, the only difference being to stop pressing when the solder paste of each pin has met and compacted in the middle of the filter (Step 1022). With solder paste of sufficient quality, the connectivity of the inner conductor may be verified with a multi-meter before proceeding. After removal from the jigs, each assembled filter body may be marked with a number and other relevant details such as construction date or inner radius size. Stamping may be desirable over engraving because the curing process may make the latter unreadable.

At this point, the filter body is fully assembled, with soft paste filling the small gap between the pins of the SMA connectors. Step 1024 may comprise removing the in-progress filter assembly from the jig portions and completing the electrical connection between the two pins without shorting to the outside wall of the filter. A solder iron with a tip wide enough to touch both connector pins simultaneously and configured to heat to 600° F. may be employed. The filling hole of the filter body may not be large enough to see through when the solder iron is inserted through the filling hole, so the soldering itself may be done blind with this procedure. In certain embodiments of the fabrication process, the soldering iron may be inserted through the filling hole and levered against the tips of both connector pins. After holding in place for five seconds, the soldering iron may be removed forming a cleanly soldered connection. A multimeter may be used to ensure the resistance between the center pins is less than 1Ω and that there is no connection between the inside pins and the surrounding filter body. Once the filter body is functioning correctly as a coaxial connector, the assembly may be filled with epoxy.

A person of skill in the art will immediately recognize that a variety of castable epoxy resins may be successfully employed in certain embodiments of the present invention. For example, and without limitation, the two main ingredients of ECCOSORB® CR epoxy are called Part X and Part Y. Part X is a viscous glue that forms the majority of the epoxy by volume, while Part Y is a liquid loaded with metal filings that give the epoxy its dielectric properties. The epoxy may be prepared by heating, mixing and degassing these ingredients; and then poured into the central cavity of a filter assemly and cured in an oven (Step 1026).

More specifically, the first filling step may comprise stirring Part X in its container using mixing sticks until it appears homogeneous. Then, 100 parts of this mixture may be weighed out onto a weighing tin (e.g., ten grams proved to be an appropriate amount for filling ten filter enclosures). After heating on a 65° C. hot plate for five minutes, 12 parts of Part Y may be added using a pipette. After mixing unheated for another five minutes until the epoxy appears homogeneous, the mixture may be placed in a vacuum for 10 minutes. Doing so degasses the epoxy, which may prevent air bubbles from forming during the curing process that may degrade electrical performance.

To fill the filters with the epoxy, both the epoxy and the enclosures may be preheated to 80° C. Doing so may make it easier to work with the epoxy by decreasing its viscosity, although doing so may also set an upper bound of roughly an hour before the epoxy will begin setting. A pipette may be filled with epoxy and placed at a very flat angle with respect to the filter itself. The epoxy may be slowly added to the rim of the filling hole until the central cavity is full, allowing the epoxy to drop into the filter cavity by itself.

One obstacle during this step is the formation of epoxy bubbles over the filling hole while the cavity is still unfilled. Slow, angled application of the epoxy may reduce this problem. Tweezers may be employed to poke and remove material from bubbles until they pop. Additionally, epoxy bubbles may be difficult to visually distinguish from a truly filled cavity. A good visual cue is to watch for the soldered pins being slowly submerged by the rising epoxy, as this proves the cavity is filling instead of just being obscured by a bubble around the filling hole.

When all filters are satisfactorily filled, any epoxy that has made its way to the edge of a filter body near the SMA connector threading may be carefully removed. Such material may glue the caps onto the connectors, making it extremely difficult to remove them after curing. Following the cleaning, the filters may be placed into a 93° C. oven for 4 hours to cure. Including a test sample of the epoxy on a weighing tin may allow for easy verification that the epoxy has fully set.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A jig for fabricating a co-axial infrared filter comprising:

- a first Subminiature version A (SMA) connector,
- a second SMA connector, and
- a filter body having
  - a wall forming an outer conductor characterized by a filling hole, and
  - a cylindrical central cavity having an open first end and an open second end;
- the jig comprising:
  - an SMA connector receiving portion configured to receive the first SMA connector and the second SMA connector; and
  - a filter body receiving portion configured to receive the filter body, the SMA connector and filter body receiving portions constructed and arranged to mechanically couple the first and second SMA connectors and the filter body together to form a sealed central cavity within the filter body.

2. The jig according to claim 1, wherein the filter body defines a cylindrical central cavity having an open first end and an open second end thereof, and the jig is operable to form an inner conductor by:

mechanically coupling the first SMA connector to the open first end of the filter body; and mechanically coupling the second SMA connector to the open second end of the filter body.

3. The jig according to claim 2, wherein the jig is further configured to position a respective connector pin of each of the first SMA connector and the second SMA connector along a long axis of the filter body.

4. The jig according to claim 3, wherein at least one of the SMA connector receiving portion and the filter body receiving portion are of a machined copper type.

5. The jig according to claim 4, wherein a moveable interface between the SMA connector receiving portion and the filter body receiving portion is of a groove-and-tab type.

6. The jig according to claim 3, wherein the filter body is of one of a full-pressed type and a half-pressed type.

7. The jig according to claim 2, wherein the SMA connector receiving portion defines at least one SMA connector slot configured to receive the first SMA connector.

8. The jig according to claim 7, wherein the filter body receiving portion defines at least one filter body slot configured to receive the filter body, and wherein each slot of the SMA connector receiving portion is aligned and positioned with a corresponding slot of the filter receiving body to enable the first SMA connector to be pressed into the first open end of the filter body.

9. The jig according to claim 8, wherein the slot in the filter body receiving position defines a cross-sectional shape selected from the group consisting of circular, triangular, square, pentagonal, hexagonal, septagonal, and octagonal.

10. The jig according to claim 7, wherein the slot in the SMA connector receiving portion defines a cross-sectional shape selected from the group consisting of circular, triangular, square, pentagonal, hexagonal, septagonal, and octagonal.

11. The jig according to claim 2, wherein the inner conductor is characterized by a radius range of 0.01 inch to 0.05 inch.

12. The jig according to claim 2, wherein a cavity radius from the longitudinal axis to an inner surface of the filter body is 0.100 inch to 0.150 inch.

13. The jig according to claim 2, wherein the cylindrical central cavity is 0.2 inch to 0.5 inch in length.

14. The jig according to claim 2, wherein the cylindrical central cavity is 0.375+/−0.05 inch in length.

15. The jig according to claim 2, wherein the cylindrical central cavity defines an inner diameter range of 0.150 inch to 0.300 inch.

16. The jig according to claim 1, wherein the jig is further configured to receive an SMA cap configured to mechanically couple to the first SMA connector.

17. The jig according to claim 1, further comprising a complimentary groove and a mating tab interface between the SMA connector receiving portion and the filter receiving portion to position and coaxially align the SMA connector receiving portion and the filter receiving portion during a pressing operation.

18. A method for producing a co-axial infrared filter comprising:

a first Subminiature version A (SMA) connector, a second SMA connector, and a filter body having a wall forming an outer conductor characterized by a filling hole, and a cylindrical central cavity having an open first end and an open second end; and using a jig comprising:

an SMA connector receiving portion configured to receive the first SMA connector and the second SMA connector, and a filter body receiving portion configured to receive the filter body;

the method comprising:

mechanically coupling the first and second SMA connectors and the filter body together to form a sealed central cavity within the filter body.

19. The method according to claim 18, further comprising forming an inner conductor by first mechanically coupling the first SMA connector to the open first end the filter body, and thereafter mechanically coupling the second SMA connector to the open second end of the filter body after the first SMA connector is mechanically coupled to the filter body.

20. A jig for fabricating a co-axial infrared filter, comprising:

a first Subminiature version A (SMA) connector, a second SMA connector, and a filter body having a wall forming an outer conductor characterized by a filling hole, and a cylindrical central cavity having an open first end and an open second end;

the jig comprising:

an SMA connector receiving portion configured to receive the first SMA connector, and a filter body receiving portion configured to receive the filter body; and the jig is operable to form an inner conductor by:

mechanically coupling the first SMA connector to the open first end of the filter body, and mechanically coupling the second SMA connector to the open second end of the filter body.

* * * * *